Feb. 19, 1946.  J. L. STABLEFORD  2,395,303
ROLL-UP SCREEN
Filed Nov. 29, 1943  2 Sheets-Sheet 1
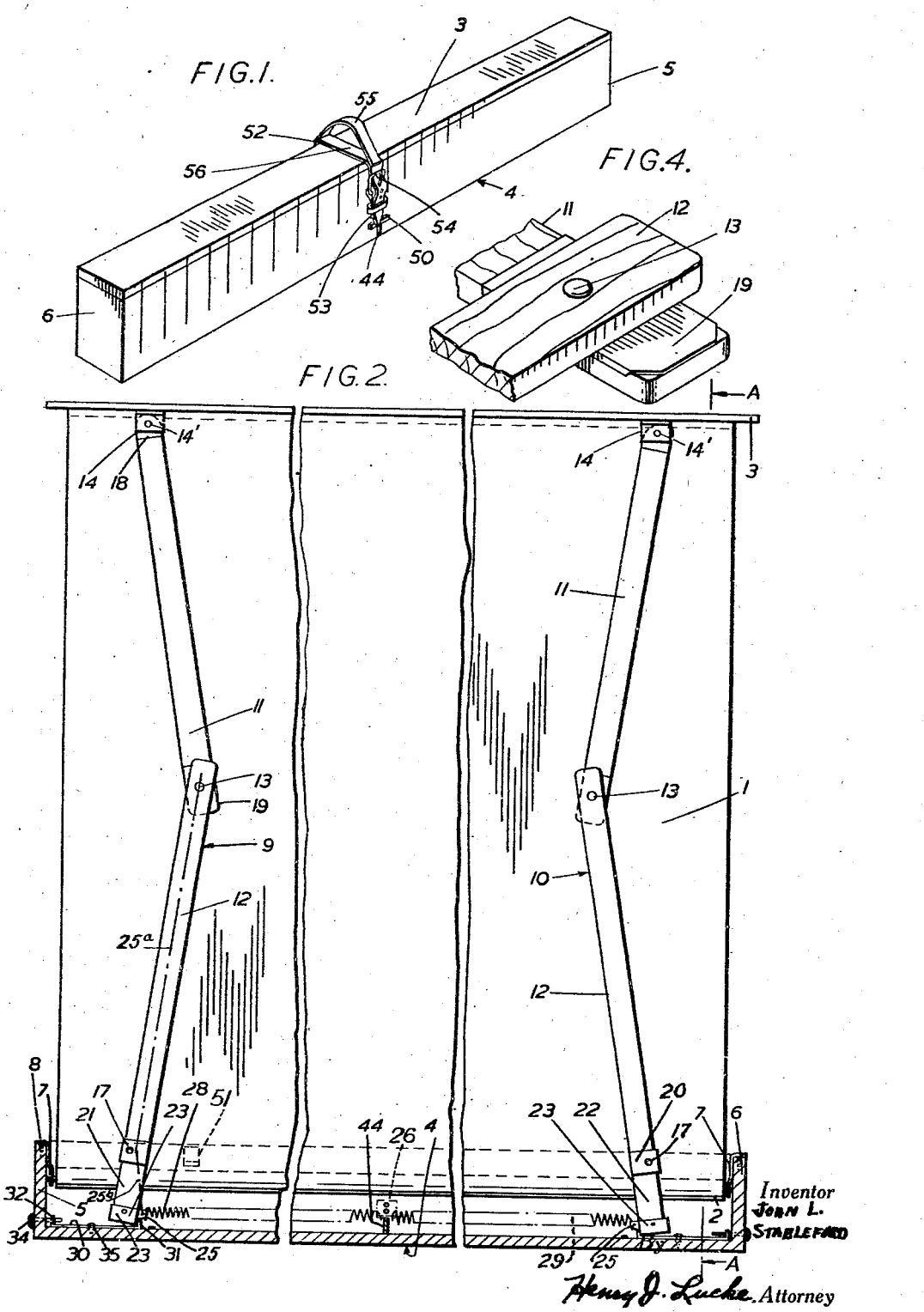

Feb. 19, 1946.  J. L. STABLEFORD  2,395,303
ROLL-UP SCREEN
Filed Nov. 29, 1943  2 Sheets-Sheet 2
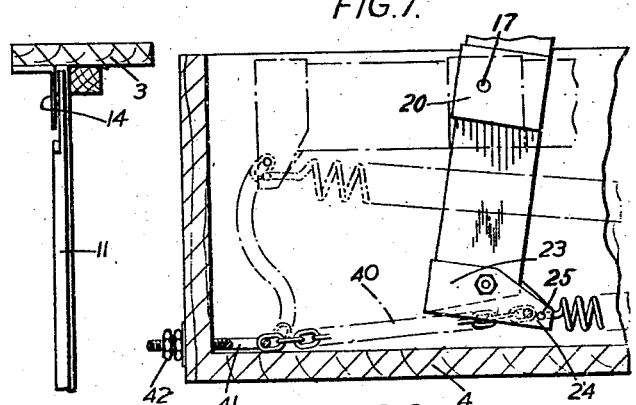
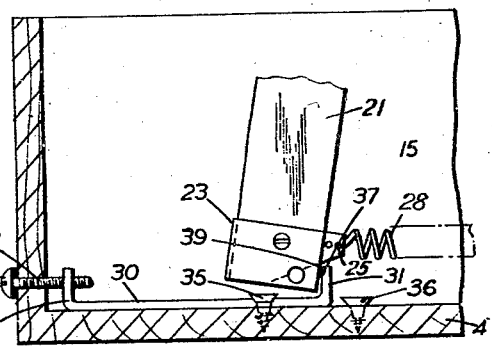
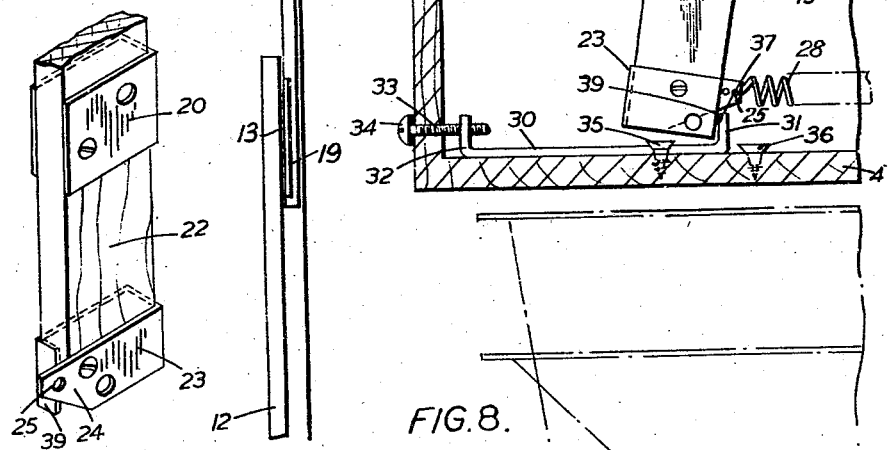
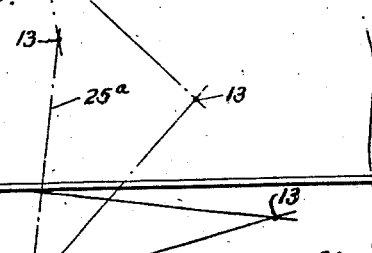
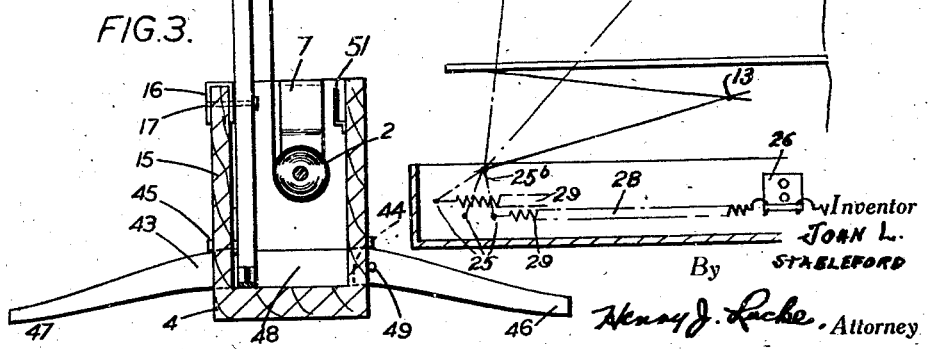

Patented Feb. 19, 1946

2,395,303

UNITED STATES PATENT OFFICE 2,395,303

ROLL-UP SCREEN

John Leslie Stableford, London, England

Application November 29, 1943, Serial No. 512,103
In Great Britain December 2, 1942

25 Claims. (Cl. 160—24)

This invention concerns improvements in or relating to roll-up screens and has especial reference to collapsible projection screens for use in cinematography and like projection systems, for example for use in halls, rooms and other places, where permanent screens cannot be erected, for the purpose of exhibiting cinematograph films, lantern slides and so on, and the invention also concerns awnings for use over the windows and doors of buildings or shops, or in any of the other usual places where awnings are used and where it is desired that the awning should be capable of being collapsed into small compass when not in use.

More particularly, the instant invention relates to improvements in roll-up screens or awnings, both hereinafter called "roll-up screens" in the description and claims. Roll-up screens, to which the invention relates, comprise a suitable flexibile sheet attached at one end to and wound upon a spring roller, a main supporting structure upon which said roller is rotatably carried, a lath at the edge of the said sheet opposite to that attached to the roller, a pair of articulated struts each comprising a plurality of hingedly jointed links and each having one end hinged to the said lath and the other end fulcrumed upon the said main supporting structure and being adapted to open and fold in a plane parallel to that of the open sheet, and spring means adapted to operate through the said struts upon the said sheet to oppose the force exerted on the sheet by the spring loading of the said spring roller.

The primary object of this invention is to provide an improved form of roll-up screen of the last mentioned character, and in accordance with one feature of the invention such a screen is provided wherein the struts each consist of two links one of which is fulcrumed on the main supporting structure and has an extension or other lever arm operatively associated therewith and disposed on the opposite side of the fulcrum to the link, such extension or lever arm being connected to a tension spring the arrangement being such that the tension spring or springs tends to or tend to extend the struts thereby opposing the tendency of the roller spring to collapse the struts and in the fully extended position the tendency of the tension spring or springs to extend the struts exceeds that of the roller spring to collapse the struts.

The said lever arms may, for example, be diametrically opposite or collinear with the fulcrumed links of the articulated struts, and may be integral extensions of such links, or may be separate members rigidly connected to such links, arranged generally on the opposite side of the fulcrum to such links though not necessarily at 180° thereto.

The said spring means may comprise at least one tension spring for each of said lever arms, each such spring being anchored at one end to the lever arm and at the other end to the said main supporting structure.

It is preferred that each of said tension springs should be relatively long and preferably when fully tensioned in use, should occupy one-half the length of the box. The use of a long spring renders it possible to use a low rate spring instead of a high rate spring so that the stresses exerted on the fulcrums of the struts, the spring anchorages, and on the main supporting structure by the springs are of a relatively low value as compared with those that would arise if high rate relatively short springs were employed.

The points of connection of the said tension spring or springs to the lever arms of the articulated struts are preferably such that when the latter are moved to their fully closed position a dead centre point with respect to the spring or springs is not reached, for otherwise difficulty may be found in effecting the initial opening of the screen. More than one spring for each lever arm may be used if desired, or alternatively instead of using separate springs for the two lever arms, one or more common springs may be employed having, or each having, its opposite ends attached to the said lever arms and being optionally anchored intermediate the ends to the said main supporting structure, e. g. centrally between the ends thereof. Anchoring the spring or springs to the main supporting structure in this way will ensure a balanced application of the power of the spring or springs to the struts, and will so ensure that the screen is centralized and substantially equally tensioned at both ends.

According to a further feature of the invention adjustable stop means may be provided for limiting the extent of the opening movements of the said articulated struts and consequently the opening movement of the sheet. Conveniently said adjustable stop means comprise a slide or bolt for each of the said extensions or lever arms, each such slide or bolt having a stop thereon for co-operation with its extension or lever arm and each slide being adjustable with respect to the main supporting structure upon which it is carried. Any suitable means may be provided for adjusting the said slide with respect to the said main supporting structure, but preferably screw and nut means are provided for this purpose.

Instead of the said adjustable stop means for limiting the movements of the said articulated struts being in the form of an adjustable slide as above described, such means may comprise a flexible member, e. g. a length of chain, anchored at one end to the lever arm of the corresponding articulated strut and anchored at the other end to a screw-threaded eye bolt, or to an equivalent device, adjustably mounted upon the said main supporting structure so that the effective length of the flexible member may be varied in order to adjust the extent which the lever arm controlled thereby may pivot in the screen opening direction.

Preferably the said main supporting structure is in the form of a long rectangular box within which the said spring roller is rotatably mounted, and this box is provided with a lid which also serves as the hereinbefore mentioned lath.

According to a further feature of the invention the fulcrums for the articulated struts on the main supporting structure and the anchorages for the said spring means are all carried on one integral member of the main supporting structure. Thus, where the latter is in the form of a long box, the fulcrums and anchorages are preferably all carried by one longitudinal wall, the rear wall, of the box. This has the advantage of avoiding the tendency of the forces exerted by the said spring means to cause the box to disintegrate as would be the case if the anchorages of the springs and the fulcrums of the struts were respectively on different parts of the box, e. g. the rear wall and the ends or base of the box.

It is especially preferred to make the main supporting structure as part of a long box as above described, where the invention is applied to a portable projection screen, and also to make such box of the smallest convenient dimensions for convenience in transport, and thus to construct it with the narrowest (from front to back) convenient base. Such a box whilst being readily portable would, however, be relatively unstable when the sheet was extended, and to mitigate against this disadvantage a further feature of the invention contemplates the provision of at least one stabilizing member adapted to pass transversely through the front and rear walls of said box so as to project beyond these front and rear walls to form feet for increasing the effective base width of the box and for stabilizing the latter when the sheet is in its extended condition. Thus the front and rear walls of the box may be provided between their ends with at least one pair of registering slots or holes through which is threaded an arcuate stabilizing bar in such a way that its downwardly directed end portions form feet respectively at some distance in front of and behind the box.

It is preferred that the extendable parts of the articulated struts and sheet and the said stabilizing means should all be adapted for complete storage within the said box when they are not in use, and to this end the box may be provided internally with supporting or carrying means for the stabilizing means. It is also preferred that the lid of the box should be maintained closed by the tension of the spring roller for the sheet, but if desired additional lid retaining and carrying handle means may be provided which may comprise a strap forming part of a carrying handle for the screen, such handle preferably comprising a transversely arranged strap member attached to the front and rear longitudinal walls of the said box, preferably between the ends thereof, in such a way that the lid of the box is not called upon to support any of the weight of the box or its contents during the carrying of the apparatus.

Preferably the rigid parts of the apparatus are made from wood as far as possible and convenient, and the struts and walls of the box and other wooden parts subject to wear and direct strain are preferably reinforced or fortified with metal bearing pieces.

In order that the invention may be thoroughly understood and readily carried into practice one embodiment of the same in the form of a projection screen will now be described, by way of example, with reference to the accompanying drawings in which:

Figure 1 is a perspective view of a portable projection screen constructed in accordance with this invention, the sheet or screen proper being collapsed within the containing box;

Figure 2 is a rear view partly, in vertical section, of the portable projection screen with the sheet in the erected condition;

Figure 3 is a vertical section on line A—A Figure 2;

Figure 4 is a perspective view showing in detail one of the joints between the two links of one of the articulated struts of the screen;

Figure 5 is a perspective view of the lower part of the lower link of one of the struts of the screen;

Figure 6 is a longitudinal sectional elevation of a part of the box containing the sheet showing one of the adjustable stop means for limiting the opening movements of one of the articulated struts;

Figure 7 is a similar view to Fig. 1 showing a modification of such adjustable stop means; and Figure 8 is a diagrammatic view illustrating the action of the screen.

The drawings illustrate a roll-up projection screen comprising a flexible sheet 1 adapted to serve as a projection screen proper. This sheet is of rectangular shape and has one edge fixed to a roller 2 and its opposite disposed parallel edge fixed to a lath 3 parallel to the axis of the roller 2. The roller is of the spring loaded rolled-blind type and is housed within a long rectangular wooden box generally indicated by the reference 4, for which the lath 3 constitutes a lid.

Each of the ends 5 and 6 of the box carries a bracket 7 formed of strip metal bent to approximately inverted L-shape and having the vertical longer arm depending within the box and vertically slotted at the lower end to receive the adjacent trunnion of the roller 2. The horizontal flange of the bracket is secured to the upper edge of its end of the box by a vertically disposed screw 8; it will be seen that the brackets 7 may thus be mounted on the ends of the box quite simply without any necessity for inserting a screw driver or other tool inside the box or of working in an awkward position during the fixing of the brackets.

The lath 3 is connected to the box 4 by a pair of articulated struts generally indicated respectively by the references 9 and 10. Each of these struts comprises a pair of wooden links, an upper link 11 and a lower link 12, pivotally connected together by a bolt or equivalent device 13 passing therethrough so that the links are relatively foldable elbow-fashion in a plane parallel to the extended sheet 1.

Each link 11 is pivoted by a pivot pin 14' and at the end remote from the joint 13 to an L-shaped metal bracket 14 fixed to the underside of the lath 3, whilst the end of each link 12 remote from the hinge joint 13 is fulcrumed upon the longitudinal back wall 15 of the box 4, this wall of the box being provided, for each of the articulated struts, with a metal sheathing 16 carrying a horizontal fulcrum pin 17 for the link 12 of each articulated strut; the fulcrums 17 are arranged as near to the ends and upper edges of the box 4 as is conveniently possible.

Where each link 11 is pivoted to its bracket 14 the link is provided with a metal protective sheathing 18 and similarly, as seen clearly in Figure 4, a metal protective sheathing 19 is provided on the link 11 at the portion thereof adjacent the link 12 where these two links are pivoted together. Each link 12 is also provided with a U-shaped metal protective sheathing 20 (Figs. 2, 5 and 7) at the position where the fulcrum pin 17 passes through it.

The distance from the centre of the pivot 14' of each link 11 to the lath 3 and the centre of the pivot 13 is equal to or a little less than the distance between the latter centre and the centre of the fulcrum 17 of the link 12, and the arrangement is such that when the links 11 and 12 are in their folded condition they lie substantially one behind the other practically horizontally within the box 4.

The lower end of each link 12 is preferably collinearly extended beyond its fulcrum 17 so as to provide each such link with an extension forming a lever arm on the opposite side of the fulcrum 17 to the link 12. These lever arms of the two articulated struts 9 and 10 are, in the drawings, respectively marked 21 and 22 and are provided at their free ends with metal sheathings 23 each of which is, as clearly shown in Figure 5, provided with a lug 24 having an anchorage hole 25. The line 25ª joining the hinge 13 and the fulcrum 17 forms an angle of between 150° and 160° with the line 25ᵇ joining the fulcrum 17 and the anchorage 25.

Midway between the ends 5 and 6 of the box 4, and affixed to the longitudinal back wall 15 of the box, is an anchorage bracket 26 of L-shape, and to the horizontal forwardly extending lug 27 of this bracket are anchored one end of each of two similar oppositely extending tension springs marked respectively 28 and 29 having their other ends respectively anchored in the anchorage holes 25 at the free ends of the lever arms 21 and 22 of the articulated struts 9 and 10.

The tension springs 28 and 29 are relatively long preferably being between two thirds and three quarters the length of one half of the box when the screen is extended and the springs are at their lowest tension. When the springs are fully tensioned by closing the screen completely into the box the springs are only just short of half the length of the box.

On the bottom of the box 4, and adjacent each end 5 and 6 thereof, is mounted an endwise movable slide or bolt 30 formed by a strip of metal having its opposite ends upturned to form at one end of the slide a stop 31 (see particularly Figure 6) and at the other end a lug 32 into which is screwed horizontally an adjusting screw 33 rotatably mounted in the corresponding end of the box and having an adjusting head 34 on the exterior of the box. The slide 30 is guided for endwise movement on the base of the box 4 by suitable guide means consisting, in the case illustrated, of the longitudinal back wall 15 of the box 4 and the head of a screw 35 arranged in front of the slide 30. A suitable screw 36 is also provided in the base of the box to limit the inward movement of the slide 30.

The stop 31 is adapted to engage at its inner surface 37 with an abutment part 39 of the sheathing 23 of the lever arm of the articulated strut at the corresponding end of the box 4 to the stop, and the position at which the stop engages the said abutment part 39 can be adjusted by rotation of the adjusting screw 33 from the exterior of the box.

In an alternative construction the said slide or bolt 30 may, as shown in Figure 7, be replaced by a flexible link, e. g. a length of chain 40, attached at one end to an eye bolt 41 passing through a hole in the adjacent end of the box 4 (and provided with adjusting nuts 42 at the outer end) and at the other end to the anchorage lug 24 of the sheathing 23 of the adjacent lever arm.

When the articulated struts 9 and 10 are folded and the sheet 1 is housed within the box 4, which would then be closed by the lath 3 as shown in Figure 1, the arrangement of the springs 28 and 29 and anchorage bracket 26, and the position of the fulcrums 17 and anchorage holes 25 of the two articulated struts, are such that a dead centre position between the anchorages 25 of the springs 28 and 29 to the lever arms 21 and 22 with respect to the fulcrums 17 and the spring anchorage 26 is not reached, so as to avoid difficulty in effecting the initial opening of the screen.

By constructing the apparatus as above described it is possible to make the box 4 of relatively small width and depth and therefore of an easily portable character, but because of its small width it is preferred to provide the apparatus with stabilizing means so that the box will not be likely to tip over in forward or rearward direction when the sheet 1 is erected.

In the embodiment of the invention illustrated in the drawings the stabilizing means comprises at least one arcuate or crescent shaped stabilizing bar 43 threaded transversely through registering vertical slots 44 and 45 provided respectively in the front and rear longitudinal walls of the box 4 so as to project in front of and behind the box in order that the end portions of the bar will constitute feet 46 and 47 engaging the supporting surface on which the screen apparatus is placed at some distance in front of and behind the box 4 in order to stabilize the box against fore-and-aft tilting. Only one stabilizing bar 43 is shown in the drawings and is disposed midway between the ends of the box 4. The bar shown is formed of sheet or strip metal which is threaded through the box on edge and has a rectilinear mid portion 48 (see Figure 3). A stop 49 is provided on the stabilizer bar to limit the extent to which it may be threaded through the box, and as the box 4 is made of wood it is preferred that it should be fortified with metal or other suitable bearing pieces 50 above the stabilizer slots 44 and 45.

A socket 51 is provided on the inside of the front wall of the box 4 to receive and carry the stabilizer bar 43 when this is not in use.

To eliminate metal catches and other complicated devices for retaining the lid 3 of the box positively closed when the screen is in the collapsed position and to provide means for carrying the screen, there is provided a leather or other suitable flexible strap which is formed in two parts, one part 52 (see Figure 1) has one end free and its other end fixed to the rear wall of the box and the other part 53 looped and fixed to the front wall of the box, the part 53 having a buckle 54 and the part 52 having a carrying handle forming portion 55 attached to it and adapted to extend in a loop over the lid 3 when the strap part 52 is engaged with the buckle 54. The strap part 52 includes a transverse portion 56 adapted to engage over the lid 3 and hold this down upon the box 4 when the strap is buckled. The said strap with its transverse carrying handle is preferably provided at the centre of the length of the box.

By way of example, the following practical information is given in respect of a screen five feet five inches wide and four feet high. In this screen the angle between the lines 25ª and 25ᵇ (Figure 2) is 155 degrees.

The pull exerted by each of the springs 28 and 29 when the sheet 1 is fully collapsed is approximately 16¼ pounds. Thus the two springs exert a combined pull of 32½ pounds. When the screen is fully extended the pull of each spring is approximately 12¼ pounds, and the combined pull of the two springs is 24½ pounds. The length of each spring varies by approximately six inches between these two positions so that the average rate of each spring is approximately two-thirds pound per inch.

The pull of the springs decreases as the screen moves from the collapsed to the extended position, but during this time the perpendicular distance between each fulcrum 17 and the moving centre line joining each anchorage point 25 to the anchorage point 26 increases until a maximum is reached shortly before the screen is fully extended, and then slightly decreases. At the commencement of the opening of the sheet the combined pull due to the spring roller and to the weight of the sheet 1, lath 3, and struts 9 and 10 is about 7 pounds. At the fully opened condition of the screen the said combined pull is equivalent to approximately 21 pounds.

In the fully open position the links 11 form an angle of about 8° with the vertical, so that no dead centre position occurs between the links 11 and 12.

The operation of the screen above described is as follows:

Assuming the screen is in the collapsed condition as in Figure 1 and it is desired to extend the sheet 1, first the lath 3 is released by undoing the strap 52. Next the stabilizing means is adjusted to extend the base area of the apparatus. The lid or lath 3 is then raised to extend the sheet 1.

Whilst the lid 3 is closed, as will be clearly seen from Figure 8, the direction of the pull exerted by each of the springs 28 and 29 upon its lever arm makes an acute angle with the length of the lever arm so that the perpendicular distance between the centre line of the spring and the fulcrum of its lever arm is small. In this condition the effort of the spring roller 2 dominates the efforts of the tension springs and maintains the lid 3 closed. As the sheet 1 is extended, the turning moments of the forces exerted by the springs 28 and 29 through the lever arms 21 and 22 increase in magnitude even though the power of the springs themselves decreases (due to the loss of tension as the lever arms 21 and 22 swing inwardly on the fulcrum 17) and remain substantial even when the screen is fully extended.

When the links 11 and 12 have reached a position such that their longitudinal center lines are approximately 8° from the vertical, the leverage by which the roller spring can collapse the struts 9 and 10 is very small so that in this position the effort exerted by the spring of the spring roller to collapse the struts 9 and 10 and to roll up the sheet 1, is dominated by the effort exerted by the tension springs 28 and 29. However, the stops 31 are so adjusted that only relatively light manual pressure needs to be exerted upon the lath 3 to cause the toggles to collapse inwardly (it being remembered that the struts do not reach a dead centre point) whereupon the leverage of the roller spring to collapse the struts rapidly increases and causes the screen to roll up, such rolling-up being, however, opposed by the efforts of the tension springs 28 and 29 to a sufficient extent to steady the rolling up action.

The extent of the opening movement of the screen is governed by the position of the stop slides 30 for, as will be seen from Figure 2, the inward swinging of the lever arms 21 and 22 under the action of the tension springs 28 and 29 is limited by the stops 31 of the slides 30 and the position of these stops is adjusted by adjusting the slides through the medium of the adjusting screws 33.

The adjustable stops enable the width to height ratio of the sheet 1 to be varied but the minimum height at which the sheet may be set must be greater than the sheet height at which the strut extending effort of the tension springs first exceeds the strut collapsing effort of the spring roller.

The said adjustable stops also serve the purpose of enabling any slack which may occur in a vertical direction at either side of the sheet 1 to be taken up, since to absorb the slack it is only necessary to adjust the stop device at the appropriate end of the sheet 1 to enable one articulated strut to unfold a little further under the action of the spring means acting upon it.

I claim:

1. A roll-up screen comprising in combination a flexible sheet attached at one end to, and wound upon, a spring roller, a main supporting structure upon which said roller is rotatably carried, a lath at the edge of said sheet opposite to that attached to the roller, a pair of articulated struts each comprising a plurality of hingedly jointed links and connecting the said lath to the said main supporting structure, each such strut having one end hinged to the said lath and the other end fulcrumed on the said main supporting structure and being adapted to open and fold in a plane parallel to that of the open sheet, a lever arm rigidly associated with that link of each of said struts fulcrumed on the said main supporting structure and arranged, with respect to the fulcrum, substantially opposite to the link with which it is rigidly associated, and spring means operatively connected to each of said lever arms and to said supporting structure and the effort exerted thereby opposing the force exerted by the spring of the said spring roller.

2. A roll-up screen comprising in combination a flexible sheet attached at one end to, and adapted to be wound upon, a spring roller, a main supporting structure upon which the said roller is carried, a lath at the edge of the said sheet opposite to that attached to the roller, a pair of articulated struts each comprising pivotally connected links, each strut having one end hinged to the said lath and the other end fulcrumed on the said main structure and being adapted to open and fold in a plane parallel to that in which the said sheet is adapted to extend, a lever arm connected to and in extension of that end of each of said strut links fulcrumed on the main supporting structure, spring means operatively associated with said lever arms and stressed when the said struts are folded, the turning moments, exerted during the extension of the said sheet by said spring means and said lever arms upon the articulated struts, increasing in magnitude until the effort to open the sheet exerted by the articulated struts becomes equal to and exceeds the counter effort of the spring roller to roll up the sheet.

3. A roll-up screen comprising in combination a flexible sheet attached at one end to, and wound upon, a spring roller, a main supporting structure upon which said roller is rotatably carried, a lath at the edge of said sheet opposite to that attached to the roller, a pair of articulated struts each comprising a pair of hingedly jointed links and connecting the said lath to the said main supporting structure, each such strut having one end hinged to the said lath and the other end fulcrumed on the said main supporting structure and being adapted to open and fold elbow-fashion, a lever arm rigidly connected to that end of each of said struts fulcrumed on the said main supporting structure and projecting from said fulcrum in a direction substantially opposite to said strut, and spring means attached to each of said lever arms and to the said supporting structure and exerting an effort opposing the effort of the said spring roller.

4. A roll-up screen comprising in combination a flexible sheet attached at one end to, and wound upon, a spring roller, a main supporting structure upon which said roller is rotatably carried, a lath at the edge of said sheet opposite to that attached to the roller, a pair of articulated struts each comprising a pair of hingedly jointed links and connecting the said lath to the said main supporting structure, each such strut having one end hinged to the said lath and the other end fulcrumed on the said main supporting structure and being adapted to open and fold elbow-fashion in a plane parallel to that of the open sheet, a lever arm connected to and in extension of that end of each of said struts fulcrumed on the said main supporting structure, tension springs each anchored at one end to said main supporting structure, and said lever arms respectively attached to the other ends of said springs, the tension in such tension springs opposing the effort of the said spring roller and ultimately, as the said sheet is extended, the sheet opening forces exerted by the said articulated struts exceeding the sheet closing effort of the spring roller.

5. A roll-up screen according to claim 3, wherein the said spring means comprises at least one tension spring for each of said lever arms, each such spring having one end attached substantially directly to its lever arm and the other end attached to the said main structure, and each such spring, when tensioned fully in use, being approximately not less than half the length of said spring roller.

6. A roll-up screen comprising in combination a flexible sheet attached at one end to, and wound upon, a spring roller, a main supporting structure upon which said roller is rotatably carried, a lath at the edge of said sheet opposite to that attached to the spring roller, a pair of articulated struts each comprising a plurality of hingedly jointed links and connecting the said lath to the said main supporting structure, each such strut having one end hinged to the said lath and the other end fulcrumed on the said main supporting structure and being adapted to open and fold in a plane parallel to that of the open sheet, a lever arm connected to and in extension of that end of each of said struts fulcrumed on the said main supporting structure, spring means attached to each of said lever arms and to the said supporting structure and the effort exerted thereby opposing the effort of the said spring roller and becoming, as the sheet is opened, ultimately sufficient to retain the sheet open against the action of the spring roller, and adjustable stop means for limiting the opening movements of the said struts.

7. A roll-up screen according to claim 6, wherein the said stop means comprises a slide for each of the said lever arms, each such slide having a stop thereon for co-operation with its lever arm, and each slide being adjustable with respect to the said main supporting member.

8. A roll-up screen according to claim 6, wherein the said stop means comprises for each of the said lever arms a slide having a stop thereon for co-operation with its lever arm, and screw and nut means are provided for adjusting said slides with respect to the said main supporting member.

9. A roll-up screen comprising in combination a flexible sheet attached at one end to, and wound upon, a spring roller, a main supporting structure in the form of an elongated box within which the said spring roller is rotatably mounted, a lid for the said box and serving as a lath to which is secured the edge of the said sheet opposite to that connected to the spring roller, at least two articulated struts each comprising a plurality of hingedly jointed links and connecting the said lath to the said main supporting structure, each such strut having one end hinged to the said lath and the other end fulcrumed on the said main supporting structure and being adapted to open and fold in a plane parallel to that of the open sheet, a lever arm rigid with, and extending beyond the fulcrum of, that link of each strut fulcrumed on the said main supporting structure, and spring means attached to each of said lever arms and to the said supporting structure and opposing the effort of the said spring roller.

10. A roll-up screen comprising in combination a flexible sheet attached at one end to, and wound upon, a spring roller, a main supporting structure in the form of an elongated rectangular box within which the said spring roller is rotatably mounted, a lid for the said box and serving as a lath to which is secured the edge of the said sheet opposite to that connected to the spring roller, a pair of articulated struts each comprising a plurality of hingedly jointed links connecting the said lath to the said main supporting structure, each such strut having one end hinged to the said lath and the other end fulcrumed on the said main supporting structure and being adapted to open and fold in a plane parallel to that of the open sheet, a lever arm on each of said struts, each such lever arm being formed by an extension beyond its fulcrum of that strut link fulcrumed upon the said main supporting structure, and at least one tension spring for each of said lever arms, each such spring having one end attached to its lever arm and the other end attached to the said main structure, and such tension springs opposing the effort exerted by the said spring roller.

11. A roll-up screen comprising in combination a flexible sheet attached at one end to, and wound upon, a spring roller, a main supporting structure in the form of an elongated box within which the said spring roller is rotatably mounted, a lid for the said box and serving as a lath to which is secured the edge of the said sheet opposite to that connected to the spring roller, a pair of articulated struts each comprising a plurality of hingedly jointed links and connecting the said lath to the said main supporting structure, each such strut having one end hinged to the said lath and the other end fulcrumed on the said main supporting structure and being adapted to open and fold in a plane parallel to that of the open sheet, a lever arm rigidly connected with that end of each of said struts fulcrumed on the said main supporting structure and extending beyond the strut on the opposite side of the fulcrum to the latter, spring means attached to each of said lever arms and to the said supporting structure and opposing the effort of the spring of the said spring roller, and at least one stabilizing member adapted to extend through slots in the front and rear walls of the said box and to project beyond each longitudinal wall thereof to form feet for increasing the effective base of the screen.

12. A roll-up screen according to claim 11, wherein the front and rear walls of the said box are provided between their ends with at least one pair of registering slots, and a stabilizing bar having downwardly directed ends is provided for each such pair of slots and is adapted to be passed through said slots so that its downwardly directed ends form feet disposed respectively in front of and behind the box.

13. A roll-up screen according to claim 11, wherein is provided adjustable stops means for limiting the opening movements of the said struts.

14. A roll-up screen comprising in combination a flexible sheet attached at one end to, and wound upon, a spring roller, a main supporting structure in the form of an elongated rectangular box within which the said spring roller is rotatably mounted, a lid for the said box and serving as a lath to which is secured the edge of the said sheet opposite to that connected to the spring roller, a pair of articulated struts each comprising a pair of hingedly jointed links and connecting the said lath to the said main supporting structure, each such strut having one end hinged to the said lath and the other end fulcrumed on the said main supporting structure and being adapted to open and fold elbow-fashion in a plane parallel to that of the open sheet, a lever arm on each of the strut links pivoted to the said main supporting structure, each such lever arm being formed by an extension beyond its fulcrum of such strut link, at least one tension spring for each of said lever arms, each such spring having one end attached to its lever arm and the other end attached to the said main structure, said tension springs opposing the effort exerted by the said spring roller and, as the said sheet is extended, ultimately exerting a sheet opening force in excess of the sheet closing force exerted by the spring roller, a slide for each of the said lever arms, each such slide having a stop thereon for co-operation with its lever arm, screw and nut means for adjusting said slides with respect to the said main supporting member, and at least one stabilizing member adapted to extend transversely through said box at the base thereof and project beyond the front and rear longitudinal sides thereof to form feet for increasing the effective base of the screen.

15. A roll-up screen comprising in combination a flexible sheet attached at one end to, and wound upon, a spring roller, a main supporting structure in the form of an elongated rectangular box within which the said spring roller is rotatably mounted, a lid for the said box and serving as a lath to which is secured the edge of the said sheet opposite to that connected to the spring roller, a pair of articulated struts each comprising a pair of hingedly jointed links and connecting the said lath to the said main supporting structure, each such strut having one end hinged to the said lath and the other end fulcrumed on the said main supporting structure and being adapted to open and fold elbow-fashion, a lever arm rigidly connected to that end of each of said struts fulcrumed on the said main supporting structure and projecting from the strut and lying substantially opposite the strut on the other side of the strut fulcrum, at least one tension spring for each of said lever arms, each such spring having one end attached to the lower end of its lever arm and the other end attached to the said main structure near the bottom thereof, such tension springs opposing the effort exerted by the said spring roller, and said fulcrums for the said struts and the connections of the said springs to the main supporting structure all being carried by one and the same longitudinal wall of the said box.

16. A roll-up screen according to claim 14, wherein each of said tension springs is, when fully tensioned in use, approximately half the length of said spring roller, the said fulcrums for the said struts and the connections of the said springs to the main supporting structure are all carried by one and the same longitudinal side wall of the said box, the extendable parts of the struts and screen and said stabilizing means are all adapted for complete storage within said box when not in use, and wherein is provided a transversely disposed lid retaining strap secured at one end to the rear wall of said box, and a fastening device at the front wall of said box detachably engaging the other end of said strap, and a carrier handle strap having its ends fixed to the said lid-retaining strap.

17. A roll-up screen comprising in combination a flexible sheet attached at one end to, and wound upon, a spring roller, a main supporting structure upon which said roller is rotatably carried, a lath at the edge of said sheet opposite to that attached to the roller, a pair of articulated struts each comprising a pair of hingedly jointed links and connecting the said lath to the said main supporting structure, each such strut having one end hinged to the said lath and the other end fulcrumed on the said main supporting structure and being adapted to open and fold elbow-fashion in a plane parallel to that of the open sheet, a lever arm connected to and in extension of that end of each of said struts fulcrumed on the said main supporting structure and arranged on the opposite side of the fulcrum to such strut, spring means attached to each of said lever arms and to the said supporting structure and opposing the effort of the said spring roller, and during the opening of the said sheet, the turning moments of the forces exerted by the said spring means upon the said lever arms increasing as the power of the spring means decreases and as the power of the spring roller increases until ultimately the opening effort exerted by the said articulated struts upon the said sheet exceeds the closing effort exerted on the sheet by the said spring roller.

18. A roll-up screen comprising in combination a flexible sheet attached at one end to, and wound upon, a spring roller, an elongated rectangular box within which the said spring roller is rotatably mounted, a lid for the said box and serving as a lath to which is secured the edge of the said sheet opposite to that connected to the spring roller, a pair of articulated struts each comprising a pair of hingedly jointed links and, connecting the said lath to the box, each such strut having one end hinged to the said lath and the other end fulcrumed on the rear longitudinal wall of the said box and being adapted to open and fold elbow-fashion in a plane parallel to that of the open sheet, a lever arm on each of said struts, each such lever arm being formed by an integral collinear extension of a strut link beyond its fulcrum, at least one tension spring for each of said lever arms, each such spring having one end attached to the free end of its lever arm at a position inwardly offset from a straight line passing the fulcrum of the lever arm and the hinged joint between the links of the associated strut and the other end of the spring attached to the rear wall of the said box near the bottom of the latter and each spring being not less in length when at its maximum tension than approximately half the length of said spring roller, stop means for each of the said lever arms, each such stop means being adapted for co-operation with its lever arm to limit the turning movement thereof in one direction, means for adjusting said stop means with respect to the rear wall of the said box, and at least one stabilizing member adapted to extend transversely through said box and beyond each longitudinal side thereof to increase the effective base width of the said box.

19. A roll-up screen according to claim 2, including adjustable stop means for varying the extent to which the said articulated struts may open.

20. A roll-up screen according to claim 2, wherein the said main supporting structure comprises an elongated box housing the said spring roller and the lid of which box is formed by the said lath, and wherein is provided at least one stabilizing bar adapted to extend transversely through the box to provide stabilizing feet disposed respectively in front of and behind the box.

21. A roll-up screen according to claim 2, wherein the said main supporting structure comprises an elongated box housing the said spring roller and the lid of which box is formed by the said lath, and wherein is provided at least one movable stabilizing bar connected to and arranged transversely of the box to provide stabilizing feet disposed respectively in front of and behind the box, and adjustable stop means disposed within said box but operable from the exterior of the latter, such stop means being adapted for co-operation with said lever arms to limit their opening movement.

22. A roll-up screen comprising a receptacle, a cover therefor, a spring-actuated roller mounted in said receptacle, a flexible screen secured at one end to said roller and at its other end to said cover, hinged folding struts at opposite sides of said screen, each of said struts having one of its ends pivotally secured inwardly of its end to said receptacle and its other end pivotally secured to said cover, and springs each having one end secured to said receptacle and its other end to one end of said struts beyond its fulcrum-support; said springs serving to force said folding struts outwardly at their hingedly connected ends to hold said screen in its extended position.

23. A roll-up screen comprising an elongated receptacle, a cover therefor, a spring-actuated roller mounted in said receptacle, a flexible screen secured at one end to said roller and at its other end to said cover; inwardly-foldable, hinged struts arranged at opposite sides of said screen and pivotally secured adjacent to, and inwardly of, their lower ends to said receptacle and pivotally secured at their upper ends to said cover, and springs disposed within said receptacle each having one end secured thereto and the other ends severally secured to the free lower ends of said struts outwardly of and beyond its fulcrum support; said springs serving to force the said foldable struts outwardly at their hingedly connected ends to hold said screen to its extended position.

24. A portable projection screen comprising an elongated receptacle to enclose a screen when retracted to inoperative position and extensible therefrom to operative position; said receptacle having registering apertures extending through the front and rear walls thereof, and stabilizing members movably disposed in said apertures and projecting beyond the front and rear walls of said receptacle to support said screen in extended operative position.

25. A roll-up screen comprising a receptacle, a cover therefor, a spring-actuated roller mounted in said receptacle, a flexible screen secured at one end to said roller and at its other end to said cover, hinged folding struts at opposite sides of said screen, each of said struts having one of its ends pivotally secured inwardly of its end to said receptacle and its other end pivotally secured to said cover, and spring means having its ends secured to one end of each of said struts beyond its fulcrum-support; said spring means serving to force said folding struts outwardly at their hingedly connected ends to hold said screen in its extended position.

JOHN LESLIE STABLEFORD.